United States Patent
Zhou (10) Patent No.: US 10,623,823 B2
(45) Date of Patent: *Apr. 14, 2020

(54) METHOD, SYSTEM, AND WEBSITE SERVER FOR PLAYING WEBSITE VIDEO

(71) Applicant: TENCENT TECHNOLOGY (SHENZHEN) COMPANY LIMITED, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 20 days.

This patent is subject to a terminal disclaimer.

(21) Appl. No.: 15/919,823

(22) Filed: Mar. 13, 2018

(65) Prior Publication Data

US 2018/0206005 A1    Jul. 19, 2018

Related U.S. Application Data (63) Continuation of application No. 15/212,625, filed on Jul. 18, 2016, now Pat. No. 9,936,265, and a
(Continued)

(30) Foreign Application Priority Data

Apr. 29, 2014    (CN) .......................... 2014 1 0176086

(51) Int. Cl.
*H04N 21/81* (2011.01)
*H04N 21/262* (2011.01)
(Continued)

(52) U.S. Cl.
CPC ........... *H04N 21/812* (2013.01); *H04L 67/02* (2013.01); *H04N 21/2393* (2013.01);
(Continued)

(58) Field of Classification Search
CPC ......... H04N 21/2393; H04N 21/26241; H04N 21/2668; H04N 21/4334; H04N 21/47217; H04N 21/6125; H04N 21/812
(Continued)

(56) References Cited

U.S. PATENT DOCUMENTS

| 2003/0014310 A1* | 1/2003 | Jung ....................... G06Q 30/02 705/14.55 |
| 2008/0109844 A1* | 5/2008 | Baldeschwieler ..... G06Q 30/02 725/35 |

(Continued)

FOREIGN PATENT DOCUMENTS

| CN | 101330517 A | 12/2008 |
| CN | 101783915 A | 7/2010 |
| CN | 102857795 A | 1/2013 |

*Primary Examiner* — Brian T Pendleton
*Assistant Examiner* — Alan H Luong
(74) *Attorney, Agent, or Firm* — Anova Law Group, PLLC (57) ABSTRACT

The present disclosure discloses a method, a system, and a website server for playing a website video. The method includes: receiving a video playback request that includes a client identification and a video identification, and querying a playback record corresponding to the client identification; accumulating video playback times in the playback record to obtain current video playback times; determining advertisement information duration corresponding to the current video playback times, where the playback times are inversely proportional to the advertisement information duration; and extracting, from an advertisement information library according to the determined advertisement information duration, advertisement information that meets the duration, acquiring video data corresponding to the video identification, inserting the extracted advertisement information ahead of the video data, and transmitting the extracted advertisement information and the video data to a (Continued)

client for playing. The solutions of the present disclosure can improve efficiency of playing a website video.

18 Claims, 6 Drawing Sheets

Related U.S. Application Data continuation of application No. PCT/CN2015/077764, filed on Apr. 29, 2015.

(51) Int. Cl.
*H04N 21/433* (2011.01)
*H04L 29/08* (2006.01)
*H04N 21/239* (2011.01)
*H04N 21/2668* (2011.01)
*H04N 21/61* (2011.01)
*H04N 21/472* (2011.01)

(52) U.S. Cl.
CPC ... *H04N 21/2668* (2013.01); *H04N 21/26241* (2013.01); *H04N 21/4334* (2013.01); *H04N 21/47217* (2013.01); *H04N 21/6125* (2013.01)

(58) Field of Classification Search
USPC .................................................... 725/32, 35
See application file for complete search history.

(56) References Cited

U.S. PATENT DOCUMENTS

| | | |
|---|---|---|
| 2008/0320512 A1 | 12/2008 | Knight |
| 2009/0222850 A1* | 9/2009 | Darnell .................... H04N 5/76 |
| | | 725/32 |
| 2010/0082428 A1 | 4/2010 | Vassilvitskii et al. |
| 2011/0093885 A1* | 4/2011 | Ravula ............... H04N 7/17336 |
| | | 725/32 |
| 2011/0145856 A1* | 6/2011 | Agarwal ................ G06Q 30/02 |
| | | 725/32 |
| 2013/0064524 A1 | 3/2013 | Griffin et al. |

* cited by examiner

METHOD, SYSTEM, AND WEBSITE SERVER FOR PLAYING WEBSITE VIDEO

CROSS-REFERENCE TO RELATED APPLICATION

This application is a continuation application of U.S. patent application Ser. No. 15/212,625, filed on Jul. 18, 2016. U.S. patent application Ser. No. 15/212,625 is a continuation of PCT Application No. PCT/CN2015/077764, filed on Apr. 29, 2015, which claims priority to a Chinese patent application No. 2014101760863, filed on Apr. 29, 2014, the content of all of which is incorporated herein by reference in their entirety.

FIELD OF THE TECHNOLOGY

The present disclosure relates to video playing technologies, and in particular, relates to a method, a system, and a website server for playing a website video.

BACKGROUND OF THE DISCLOSURE

Website video is often provided by a video service website to a client, using streaming media as main playback forms. By using the website video, the client may play, online live or on-demand, audio and video files as needed.

With growing popularity of the website video, the scale of development of the website video also becomes wider. How to further improve efficiency of playing the website video becomes a focus of attention. In order to broaden the playing function of the website video, normally, advertisement information may be inserted before video data is requested. Moreover, recently, more television services also begin to transfer their operation by moving plastered advertisement information usually in television video playback to website video playback. The advertisement information is a small piece of information plastered before start of a video playing. A time length for playing the advertisement information is always very short, normally from 5 to 60 seconds.

Since a large amount of advertisement information needs to be played in the website video, how to effectively insert the advertisement information into video data becomes a problem demanding prompt solution.

SUMMARY

The present disclosure provides a method for playing a website video, and the method can improve efficiency of playing a website video.

The present disclosure provides a system for playing a website video, and the system can improve efficiency of playing a website video.

The present disclosure provides a website server for playing a website video, and the website server can improve efficiency of playing a website video.

A method for playing a website video is provided, the method including:

receiving a video playback request that includes a client identification and a video identification, and querying a playback record corresponding to the client identification;

accumulating video playback times in the playback record to obtain current video playback times;

determining advertisement information duration corresponding to the current video playback times, and the playback times being inversely proportional to the advertisement information duration; and extracting, from an advertisement information library according to the determined advertisement information duration, advertisement information that meets the duration, acquiring video data corresponding to the video identification, inserting the extracted advertisement information ahead of the video data, and transmitting the extracted advertisement information and the video data to a client for playing.

A system for playing a website video is provided, the system including a client and a website server;

the client sending a video playback request that includes a client identification and a video identification to the website server, receiving video data fed back by the website server, and playing the video data; and the website server receiving the video playback request from the client, and querying a playback record corresponding to the client identification; accumulating video playback times in the playback record to obtain current video playback times; determining advertisement information duration corresponding to the current video playback times, and the playback times being inversely proportional to the advertisement information duration; and extracting, from an advertisement information library according to the determined advertisement information duration, advertisement information that meets the duration, acquiring video data corresponding to the video identification, inserting the extracted advertisement information ahead of the video data, and transmitting the extracted advertisement information and the video data to the client.

A website server playing a website video is provided, the website server including a request receiving unit, a query processing unit, an advertisement information duration determining unit, and a video data processing unit;

the request receiving unit receiving a video playback request that includes a client identification and a video identification, and sending the video playback request to the query processing unit;

the query processing unit receiving the video playback request from the request receiving unit, and querying a playback record corresponding to the client identification; and accumulating video playback times in the playback record to obtain current video playback times, and sending the current video playback times and the video playback request to the advertisement information determining unit;

the advertisement information determining unit receiving the current video playback times and the video playback request from the query processing unit, determining advertisement information duration corresponding to the current video playback times, and sending the advertisement information duration and the video playback request to the video data processing unit, and the playback times being inversely proportional to the advertisement information duration; and the video data processing unit receiving the advertisement information duration and the video playback request from the advertisement information determining unit, extracting, from an advertisement information library according to the determined advertisement information duration, advertisement information that meets the duration, acquiring video data corresponding to the video identification, inserting the extracted advertisement information ahead of the video data, and transmitting the extracted advertisement information and the video data to a client corresponding to the client identification.

It can be seen from the foregoing solutions that in the present disclosure, a video playback request is received, and a playback record corresponding to a client identification in the video playback request is queried; video playback times in the playback record are accumulated to obtain current video playback times; advertisement information duration corresponding to the current video playback times is determined, where the playback times are inversely proportional to the advertisement information duration; and advertisement information that meets the duration is extracted from an advertisement information library according to the determined advertisement information duration, video data corresponding to the video identification is acquired, the extracted advertisement information is inserted ahead of the video data, and the video data is transmitted to the client for playing.

In the present disclosure, during a process of video playback, a playback record corresponding to a client identification is stored, current video playback times are determined according to the playback record, and advertisement information duration is determined by using the current video playback times, where the playback times are inversely proportional to the advertisement information duration; and then advertisement information that meets the advertisement information duration is inserted into video data.

By using the solutions of the present disclosure, the advertisement information duration is adjusted properly according to the acquired video playback times, which ensures delivery of the advertisement information to a certain degree and avoids a too-frequent delivery. In this way, efficiency of playing a website video is improved and advertisement information is effectively inserted into video data.

DESCRIPTION OF EMBODIMENTS

In order to make the objectives, technical solutions and advantages of the present disclosure clearer, the present disclosure is further described below in detail with reference to the embodiments and accompanying drawings.

When playing a website video, advertisement information having a relatively long playing time, e.g., of 60 seconds, is usually inserted into video data. When a client sends multiple video playback requests during a short period of time, the client have to play the advertisement information frequently and for multiple times, leading to low efficiency of playback. For example, within 10 minutes, the client may play on-demand videos for 6 times; correspondingly, the client plays the advertisement information of 60 seconds for 6 times, which has a big impact on video data requested by the client and reduces efficiency of playing a website video.

In the present disclosure, during a process of video playback, a playback record corresponding to a client identification is stored, current video playback times are determined according to the playback record, and advertisement information duration (e.g., the time length for playing the advertisement information) is determined by the current video playback times, for example, the playback times are inversely proportional to the advertisement information duration; and then advertisement information that meets the advertisement information duration is inserted into video data. By using the solutions of the present disclosure, the advertisement information duration is adjusted properly according to the acquired video playback times, which ensures delivery of the advertisement information to a certain degree and avoids the too frequent delivery. In this way, efficiency of playing a website video is improved and advertisement information is effectively inserted into video data.

Figure 1:
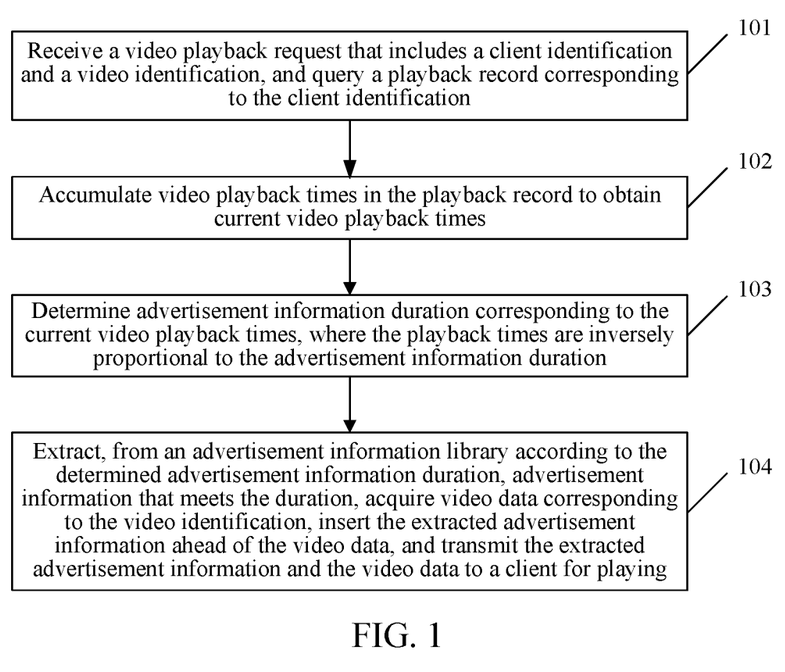
FIG. 1 is a schematic flowchart of an exemplary method for playing a website video according to the present disclosure.

Referring to FIG. 1, FIG. 1 is a schematic flowchart of a method for playing a website video according to the present disclosure. The method includes the following steps:

Step 101: Receive a video playback request that includes a client identification and a video identification, and query a playback record corresponding to the client identification.

In the present disclosure, a website server stores a corresponding playback record for a client, and the playback record corresponds to a client identification. The client identification is, for example, an MAC address of a client browser. When the client logs in the website server by using a user account, the client identification may also be the user account; and so on.

Content included in the playback record may be set as needed, for example, including video playback times, a time of each video playback request, and advertisement information duration corresponding to the first video playback.

Step 102: Accumulate video playback times in the playback record to obtain current video playback times.

The playback record stores times of occurred video playback operations. 1 is added accumulatively to the video playback times to obtain the current video playback times.

Step 103: Determine advertisement information duration corresponding to the current video playback times, where the playback times are inversely proportional to the advertisement information duration.

The playback times being inversely proportional to the advertisement information duration may be implemented in many manners. For example, a list of inverse proportion between the playback times and the advertisement information duration is pre-established, the advertisement information duration decreases as the playback times increase, but not necessarily to decrease progressively according to a fixed difference value; or, corresponding to the playback times, the advertisement information duration decreases progressively according to a fixed difference value. An example is described below.

The current video playback times are represented as n, the determining advertisement information duration corresponding to the current video playback times includes:

extracting, from the playback record, advertisement information duration of the first video playback, which is represented as M; and representing the advertisement information duration corresponding to the current video playback times as Y, and calculating in the following equation as:

$Y = M - X*(n-1)$, where $X$ is a unit length of advertisement information.

Under some special situations, a Y value may be less than 0; in this situation, the Y value is set to 0, that is, no advertisement information is inserted into video data.

For the foregoing example, the present disclosure further provides an optimization solution. Specifically, before the determining of advertisement information duration corresponding to the current video playback times, the method further includes:

determining a time of a current video playback request, which is represented as Tn;

extracting, from the playback record, a time of the first video playback request, which is represented as T1; and subtracting Tn from T1 to obtain a subtraction value, determining that the subtraction value is less than a set time period, and performing the step of determining advertisement information duration corresponding to the current video playback times.

If it is determined that the subtraction value is not less than the set time period, the following implementation may further be used:

emptying the playback record, using the current video playback request as the first video playback request to be recorded in the playback record, recording a time of the first video playback request in the playback record, and performing the step of determining advertisement information duration corresponding to the current video playback times.

Step 104: Extract, from an advertisement information library according to the determined advertisement information duration, advertisement information that meets the duration, acquire video data corresponding to the video identification, insert the extracted advertisement information ahead of the video data, and transmit the extracted advertisement information and the video data to a client for playing.

The website video playback solution in FIG. 1 may be applied to playback of all video data provided by the website server. For example, a terminal of a client identification being M continuously requests for video data of different themes for multiple times, being sports news, film To Return, episode 10 of television series Sources, and the like. The website server shortens successively, according to an order of video playback requests, advertisement information duration inserted into the video data until the advertisement information duration is 0.

The website video playback solution in FIG. 1 may also be applied to playback of video data of a specific type. For example, the solution applied to playback of video data of a specified theme. It is assumed that the specified theme is the television series Sources, correspondingly, the website server stores a playback record of a corresponding client identification, and the playback record stores video playback times of the television series Sources. In this case, the video identification in a video playback request is an episode of the television series Sources, and every time requesting is performed, 1 is added accumulatively to video playback times in the playback record. Assuming that video data of episodes 1 to 5 of the television series Sources is requested continuously, the website server shortens successively, according to an order of video playback requests, advertisement information duration inserted into the video data until the advertisement information duration is 0. For another example, the solution is applied to playback of a long video, that is, the video playback solution provided in the present disclosure is only applied to a long video. A long video is a video that exceeds a certain time length for playing. For example, a video that is larger than 1 minute is referred to as a long video. Correspondingly, before step 101 of querying a playback record corresponding to the client identification, the method may further include:

acquiring corresponding video data description information by using the video identification; and acquiring a video type from the video data description information, determining whether the video type is a long video, and if yes, performing the step of querying a playback record corresponding to the client identification; if not, acquiring video data corresponding to the video identification, and transmitting the video data to a client for playing. That is, for a short video that is smaller than 1 minute for playing, no advertisement information is inserted, and video data is fed back directly for playing.

In the present disclosure, during a process of video playback, a playback record corresponding to a client identification is stored, current video playback times are determined according to the playback record, and advertisement information duration is determined by using the current video playback times, for example, the playback times are inversely proportional to the advertisement information duration; and then advertisement information that meets the advertisement information duration is inserted into video data. By using the solutions of the present disclosure, the advertisement information duration is adjusted properly according to the acquired video playback times, which ensures delivery of the advertisement information to a certain degree and avoids a too frequent delivery. In this way, efficiency of playing a website video is improved and advertisement information is effectively inserted into video data.

Figure 2:
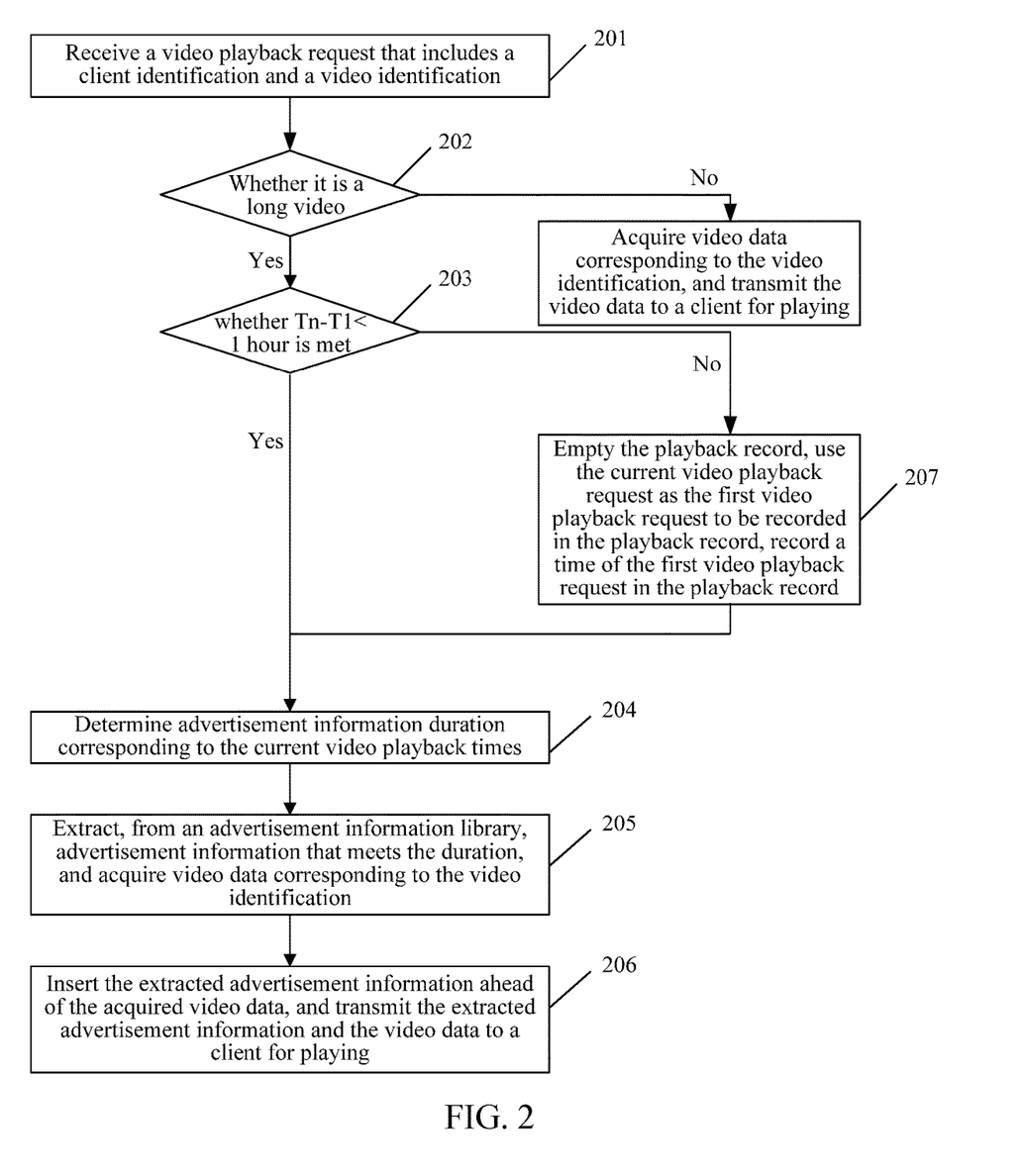
FIG. 2 is a flowchart of an exemplary method for playing a website video according to the present disclosure.

Another exemplary method for playing a website video in the present disclosure is illustrated in FIG. 2. In this example, advertisement information is only inserted into a long video. The flowchart of FIG. 2 includes the following steps:

Step 201: Receive a video playback request that includes a client identification and a video identification.

A website server stores a great amount of video data, and description information of each piece of video data. The description information includes a video identification. Meanwhile, advertisement information that needs to be inserted into the video data is stored in an advertisement information library. In this example, it is assumed that duration of each piece of advertisement information is 15 seconds, and at least one piece of advertisement information may be selected for inserting.

After logging in a video website, a user may select a video that needs to be played, and send a video playback request to the website server by using a client.

Step 202: Acquire corresponding video data description information by using the video identification, acquire a video type from the video data description information, determine whether the video type is a long video, and if yes, perform step 203; if not, acquire video data corresponding to the video identification, and transmit the video data to a client for playing.

If it is a short video, no pre-video advertisement information is inserted, and video data is played directly.

Step 203: Query a playback record corresponding to the client identification, accumulate video playback times in the playback record to obtain current video playback times, determine a time of a current video playback request, which is represented as Tn; extract, from the playback record, a time of the first video playback request, which is represented as T1; and determine whether Tn−T1<1 hour, and if yes, perform step 204, if not, perform step 207.

The website server records playback information of a long video, and stores the playback information in the playback record, including video playback times, a time of each video playback request, and advertisement information duration corresponding to the first video playback, and the like. Specifically, a cookie may be generated for each client identification, so as to record the playback information.

In this step, 1 is added accumulatively to the video playback times to obtain the current video playback times. Moreover, the video playback times in the playback record are updated by the current video playback times.

Step 204: Determine advertisement information duration corresponding to the current video playback times.

For example, this step includes: extracting, from the playback record, advertisement information duration of the first video playback, which is represented as M; and representing the advertisement information duration corresponding to the current video playback times as Y, and calculating in the following equation: $Y=M-X*(n-1)$, where X is a unit length of advertisement information. In this step, M is 60 seconds, X is 15 seconds. Correspondingly, if it is the first video playback request, a Y value is 60 seconds; if it is the second video playback request, a Y value is 45 seconds; if it is the third video playback request, a Y value is 30 seconds; if it is the fourth video playback request, a Y value is 15 seconds; if it is the fifth video playback request, a Y value is 0 second, that is, no advertisement information is inserted into video data of the fifth video playback request; and after the fifth video playback request, if still within 1 hour, advertisement information is no longer inserted.

Step 207: Empty the playback record, use the current video playback request as the first video playback request to be recorded in the playback record, record a time of the first video playback request in the playback record, and perform step 204.

Performing step 204 refers to extracting advertisement information duration corresponding to the first video playback request, 60 seconds in this example.

Step 205: Extract, from an advertisement information library according to the determined advertisement information duration, advertisement information that meets the duration, and acquire video data corresponding to the video identification.

Step 206: Insert the extracted advertisement information ahead of the acquired video data, and transmit the extracted advertisement information and the video data to a client for playing.

Figure 3:
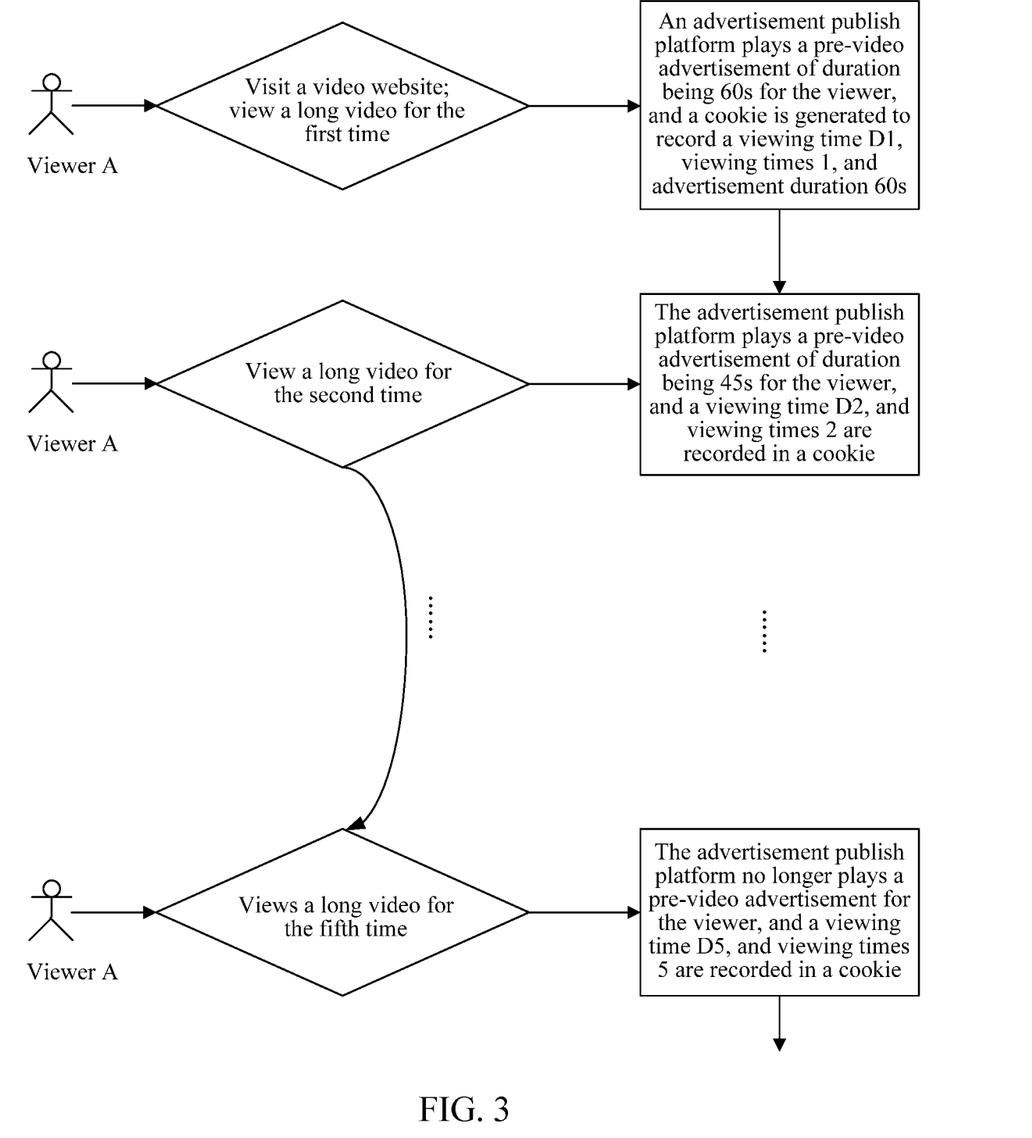
FIG. 3 is flowchart of an exemplary video playback including five long videos viewed continuously by a viewer according to the present disclosure.

The pre-video advertisement information may be information such as a notice, an alarm, an announcement, and may also be advertisement information. Advertisement information is used as an example for description herein and may be interchangeable with any information for playing. As shown in FIG. 3, FIG. 3 is flowchart of an exemplary video playback having five long videos to be viewed continuously by a viewer A. In FIG. 3, the viewer A visits a video website, and requests for viewing a long video for the first time; an advertisement publish platform plays a pre-video advertisement of 60 s before the viewer views the long video; and a cookie is generated for the viewer to record that the viewer viewed a long video at a time D1, times for viewing a long video is 1, and duration of playing a pre-video advertisement is 60 s.

When the viewer views a long video for the second time, the advertisement publish platform determines, according to the cookie of the viewer, that a viewing time for the last time is D1, times for viewing a long video is 1, and duration of playing a pre-video advertisement is 60 s; if a viewing time for the second time is D2, and a time difference between D2 and D1 is within one hour, the times for viewing a long video is set to N+1 in the cookie, that is 2, and a pre-video advertisement of duration being 45 s is played for the viewer.

In a similar way, when the viewer views a long video for the fifth time, and it is determined according to the cookie of the viewer that the fifth time of viewing occurs within one hour, the advertisement publish platform no longer publishes an advertisement for the viewer.

By using the solution of FIG. 3, a balance is found between user satisfaction and advertisement opportunities; distraction is not caused by advertisements or it is avoided that advertisements become too slow, so as not to alienate users, which improves video playback experience without reducing advertisement services.

Figure 4:
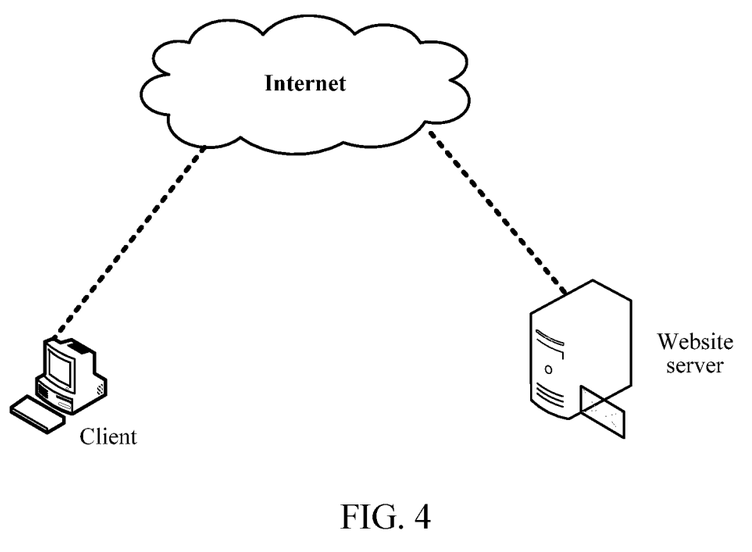
FIG. 4 shows an exemplary network environment of playing a website video according to the present disclosure.

Referring to FIG. 4, FIG. 4 shows an example of a network environment of playing a website video according to the present disclosure. In the example, a browser uses a client to access a website server through Internet, logs in a video playback webpage provided by the website server, selects a video that needs to be played, and sends a video playback request that includes a client identification and a video identification to the website server; the website server queries a playback record, obtains current video playback times, determines advertisement information duration corresponding to the current video playback times, where the playback times are inversely proportional to the advertisement information duration, then extracts advertisement information that meets the advertisement information duration, inserts the extracted advertisement information into corresponding video data, and transmits the extracted advertisement information and the video data to the client for playing.

Figure 5:
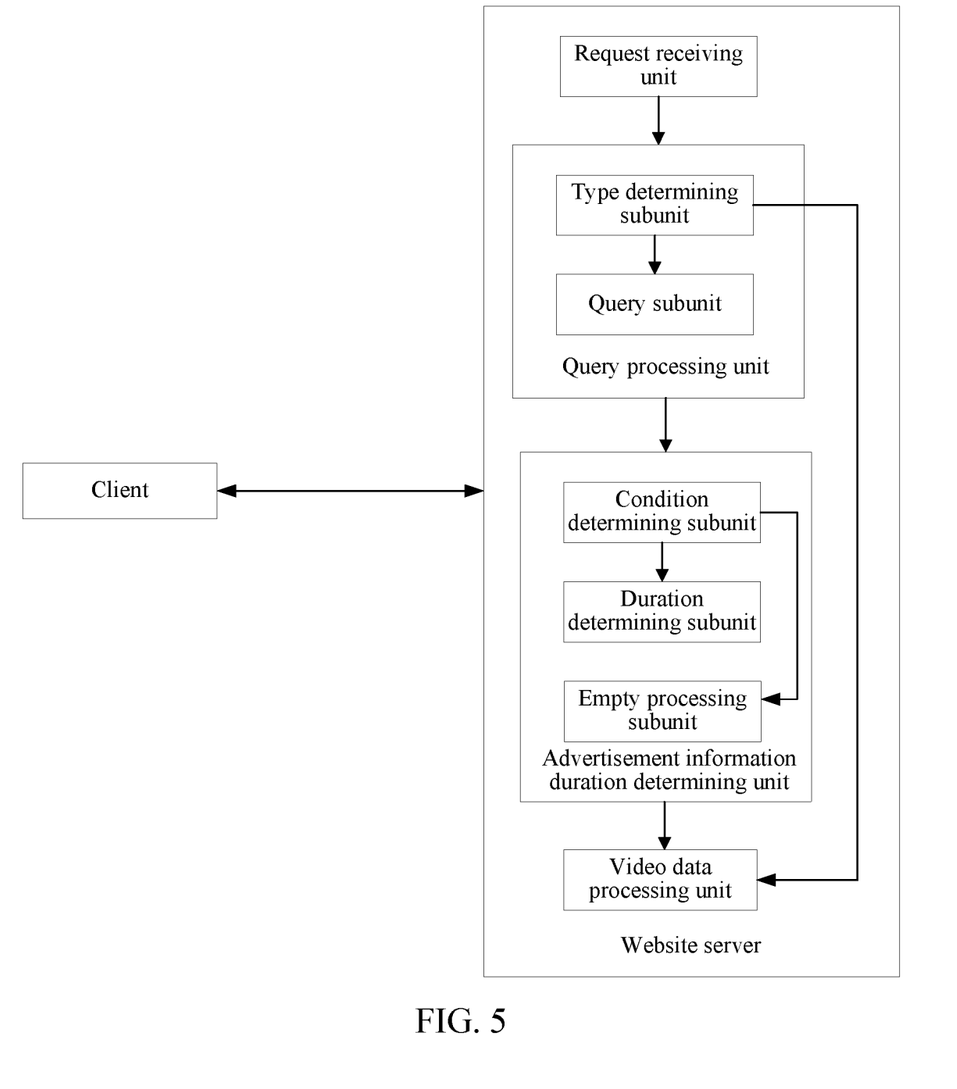
FIG. 5 is a schematic structural diagram of a system for playing a website video according to the present disclosure.

Referring to FIG. 5, FIG. 5 is a schematic structural diagram of a system for playing a website video according to the present disclosure. The system includes a client and a website server.

The client sends a video playback request that includes a client identification and a video identification to the website server, receives video data fed back by the website server, and plays the video data.

The website server receives the video playback request from the client, and queries a playback record corresponding to the client identification; accumulates video playback times in the playback record to obtain current video playback times; determines advertisement information duration corresponding to the current video playback times, where the playback times are inversely proportional to the advertisement information duration; and extracts, from an advertisement information library according to the determined advertisement information duration, advertisement information that meets the duration, acquires video data corresponding to the video identification, inserts the extracted advertisement information ahead of the video data, and transmits the extracted advertisement information and the video data to the client.

Preferably, the website server includes a request receiving unit, a query processing unit, an advertisement information determining unit and a video data processing unit.

The request receiving unit receives the video playback request from the client, and sends the video playback request to the query processing unit.

The query processing unit receives the video playback request from the request receiving unit, and queries a playback record corresponding to the client identification; and accumulates video playback times in the playback record to obtain current video playback times, and sends the current video playback times and the video playback request to the advertisement information determining unit.

The advertisement information determining unit receives the current video playback times and the video playback request from the query processing unit, determines advertisement information duration corresponding to the current video playback times, and sends the advertisement information duration and the video playback request to the video data processing unit, where the playback times are inversely proportional to the advertisement information duration.

The video data processing unit receives the advertisement information duration and the video playback request from the advertisement information determining unit, extracts, from an advertisement information library according to the determined advertisement information duration, advertisement information that meets the duration, acquires video data corresponding to the video identification, inserts the extracted advertisement information ahead of the video data, and transmits the extracted advertisement information and the video data to a client corresponding to the client identification.

In one embodiment, the advertisement information duration determining unit includes a duration determining subunit, where the duration determining subunit represents the current video playback times as n, and extracts, from the playback record, advertisement information duration of the first video playback, which is represented as M; and represents the advertisement information duration corresponding to the current video playback times as Y, and calculates in the following equation: $Y=M-X*(n-1)$, where X is a unit length of advertisement information.

In one embodiment, the advertisement information duration determining unit further includes a condition determining subunit, where the condition determining subunit determines a time of a current video playback request, which is represented as Tn; extracts, from the playback record, a time of the first video playback request, which is represented as T1; and the condition determining subunit subtracts Tn from T1 to obtain a subtraction value, determines that the subtraction value is less than a set time period, and sends a start instruction to the duration determining subunit.

The duration determining subunit extracts the advertisement information duration of the first video playback from the playback record and calculates a Y value only after receiving the start instruction.

In one embodiment, the advertisement information duration determining unit further includes an empty processing subunit; and the condition determining subunit sends an execution instruction to the empty processing subunit when determining that the subtraction value is not less than the set time period.

The empty processing subunit receives the execution instruction from the condition determining subunit, empties the playback record, uses the current video playback request as the first video playback request to be recorded in the playback record, records a time of the first video playback request in the playback record; and acquires advertisement information duration corresponding to the first video playback request as the advertisement information duration corresponding to the current video playback times.

Preferably, the query processing unit includes a type determining subunit and a query subunit.

The type determining subunit receives the video playback request from the request receiving unit, acquires corresponding video data description information by using the video identification included in the video playback request; and acquires a video type from the video data description information, determines whether the video type is a long video, and if yes, sends the video playback request to the query subunit; if not, sends a short video processing request that includes the client identification and the video identification to the video data processing unit.

The query subunit receives the video playback request from the type determining subunit, and queries a playback record corresponding to the client identification; and accumulates video playback times in the playback record to obtain current video playback times, and sends the current video playback times and the video playback request to the advertisement information duration determining unit.

The video data processing unit receives the short video processing request from the type determining subunit, acquires video data corresponding to the video identification, and transmits the video data to a client corresponding to the client identification.

For example, the disclosed methods can be implemented by terminal(s) (e.g., a terminal of a client) and server(s) (e.g., a website server), each including one or more processor, and a non-transitory computer-readable storage medium having instructions stored thereon. The instructions can be executed by the one or more processors thereof to implement the methods disclosed herein. In some cases, the instructions can include one or more modules corresponding to the disclosed methods.

Figure 6:
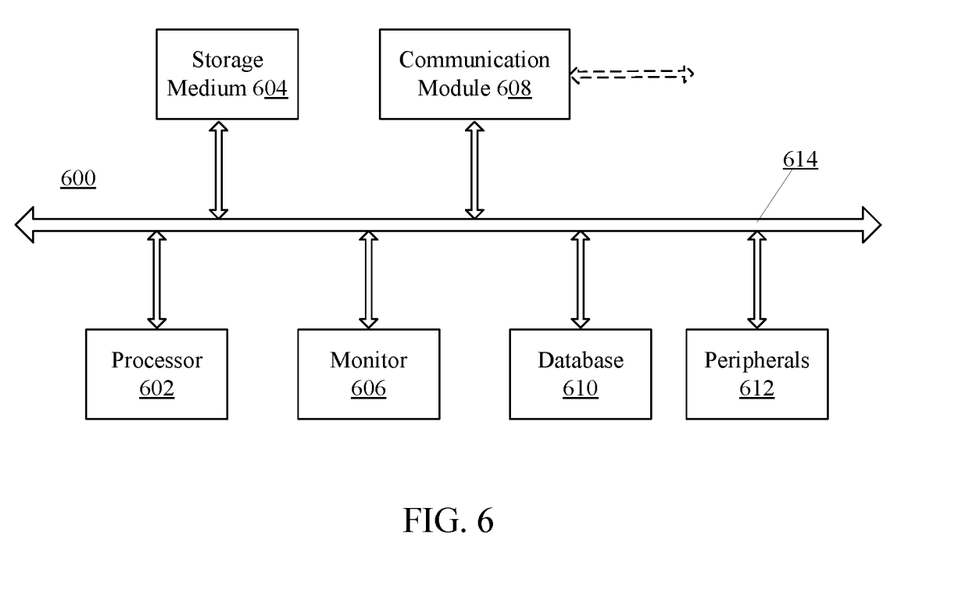
FIG. 6 illustrates an exemplary computer system consistent with various disclosed embodiments.

In various embodiments, the terminal(s), server(s), and/or various modules/units disclosed herein may be implemented using one or more computing systems. FIG. 6 illustrates an exemplary computing system.

As shown in FIG. 6, a computing system 600 may include a processor 602, a storage medium 604, a monitor 606, a communication module 608, a database 610, peripherals 612, and one or more bus 614 to couple the devices together. Certain devices may be omitted and other devices may be included.

Processor 602 can include any appropriate processor or processors. Further, processor 602 can include multiple cores for multi-thread or parallel processing. Storage medium 604 may include memory modules, such as ROM, RAM, and flash memory modules, and mass storages, such as CD-ROM, U-disk, removable hard disk, etc. Storage medium 604 may store computer programs for implementing various processes, when executed by processor 602.

Further, peripherals 612 may include I/O devices such as keyboard and mouse, and communication module 608 may include network devices for establishing connections, e.g., through the communication network. Database 610 may include one or more databases for storing certain data and for performing certain operations on the stored data, such as webpage browsing, database searching, etc.

The processor(s) 602 can upload executable files corresponding to processes of one or more programs/instructions to the storage medium 604, such as a non-transitory storage medium. The processor(s) 602 can then be used to run these one or more programs stored in the storage medium 604. For example, the processor(s) 602 can cause the exemplary device to perform the disclosed methods for playing website video.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for playing a website video, comprising:
receiving a video playback request that comprises a client identification and a video identification;
querying a playback record corresponding to the client identification, wherein the playback record comprises a number of current video playback times within a set time period;
extracting, from an advertisement information library, an advertisement information based on the current video playback times, comprising:
when the number of current video playback times is 1, extracting the advertisement information having a default advertisement information duration; and
when the number of current video playback times is greater than 1,
extracting the advertisement information having a shorter advertisement information duration than a most recently transmitted advertisement information corresponding to the client identification;
inserting the extracted advertisement information ahead of a video data corresponding to the video identification; and
transmitting the extracted advertisement information and the video data to a client for playing; and
when the number of current video playback times is equal to or greater than a preset threshold, transmitting the video data to the client for playing without inserting any advertisement information.

2. The method according to claim 1, before the step of querying the playback record corresponding to the client identification, further comprising:
acquiring a video data description information corresponding to the video identification;
acquiring a video type from the video data description information; and
determining whether the video type is a long video, and if yes, performing the step of querying the playback record corresponding to the client identification; if not, acquiring the video data corresponding to the video identification and transmitting the video data to the client for playing.

3. The method according to claim 1, wherein when the number of current video playback times is greater than 1 and less than the preset threshold, the advertisement information duration of the extracted advertisement information is inversely proportional to the number of current video playback times, and the number of current video playback times is obtained by accumulating video playback times in the playback record.

4. The method according to claim 3, wherein the number of current video playback times are represented as n, and the step of extracting advertisement information based on the number of current video playback times comprises:
extracting, from the playback record, the advertisement information duration of a first video playback, which is represented as M; and
representing the advertisement information duration corresponding to the number of current video playback times as Y, and calculating in the following manner to obtain:

$Y=M-X*(n-1)$, wherein $X$ is a unit length of advertisement information.

5. The method according to claim 1, wherein before the step of extracting, from the advertisement information library, the advertisement information based on the number of current video playback times, further comprises:
determining a time of a number of current video playback request, which is represented as Tn;
extracting, from the playback record, a time of a first video playback request, which is represented as T1; and
subtracting Tn from T1 to obtain a subtraction value, determining that the subtraction value is less than the set time period, and performing the step of extracting advertisement information based on the number of current video playback times.

6. The method according to claim 5, wherein if it is determined that the subtraction value is not less than the set time period, the method further comprises:
emptying the playback record, using the number of current video playback request as the first video playback request to be recorded in the playback record, recording the time of the first video playback request in the playback record, and performing the step of extracting advertisement information based on the number of current video playback times.

7. A method for playing a website video, comprising:
storing a playback record corresponding to a client identification;
determining a time of a number of current video playback times within a set time period according to the playback record;
determining an advertisement information duration of an advertisement information for being played with a video data of the website video based on the number of current video playback times, comprising:
when the current video playback times is 1, inserting an advertisement information having a default advertisement information duration into the video data;
when the number of current video playback times is greater than 1, inserting, into the video data, an advertisement information having a shorter advertisement information duration than a most recently played advertisement information corresponding to the client identification;
when the number of current video playback times is equal to or greater than a preset threshold, playing the video data without inserting any advertisement information.

8. The method according to claim 7, wherein the step of storing the playback record corresponding to the client identification comprises:
receiving a video playback request, wherein the video playback request comprises the client identification and a video identification; and
querying the playback record corresponding to the client identification, wherein the playback record comprises the number of current video playback times.

9. The method according to claim 8, wherein the video data corresponds to the video identification.

10. The method according to claim 8, wherein the number of current video playback times is obtained by accumulating video playback times in the playback record corresponds to the video identification.

11. The method according to claim 8, before the step of querying the playback record corresponding to the client identification, the method further comprising:
acquiring a video data description information corresponding to the video identification; and
acquiring a video type from the video data description information, determining whether the video type is a long video, and if yes, performing the step of querying the playback record corresponding to the client identification; if not, acquiring the video data corresponding to the video identification and transmitting the video data to the client for playing.

12. A website server for providing a pre-video advertisement of a website, comprising:
a memory;
a processor coupled to the memory;
wherein the processor is configured for:
receiving a video playback request that comprises a client identification and a video identification;
querying a playback record corresponding to the client identification, wherein the playback record comprises a number of current video playback times within a set time period;
extracting, from an advertisement information library, an advertisement information based on the current video playback times, comprising:
when the number of current video playback times is 1, extracting the advertisement information having a default advertisement information duration; and
when the number of current video playback times is greater than 1, extracting the advertisement information having a shorter advertisement information duration than a most recently transmitted advertisement information corresponding to the client identification;
inserting the extracted advertisement information ahead of a video data corresponding to the video identification;
transmitting the extracted advertisement information and the video data to a client for playing; and
when the number of current video playback times is equal to or greater than a preset threshold, transmitting the video data to the client for playing without inserting any advertisement information.

13. The website server according to claim 12, wherein the processor is further configured for:
acquiring a video data description information corresponding to the video identification;
acquiring a video type from the video data description information; and
determining whether the video type is a long video, and if yes, performing the step of querying the playback record corresponding to the client identification; if not, acquiring the video data corresponding to the video identification and transmitting the video data to the client for playing.

14. The website server according to claim 12, wherein when the number of current video playback times is greater than 1 and less than the preset threshold, the advertisement information duration of the extracted advertisement information is inversely proportional to the number of current video playback times, and the number of current video playback times is obtained by accumulating video playback times in the playback record.

15. The website server according to claim 12, wherein the processor is further configured for:
representing the number of current video playback times as n, and extracting, from the playback record, the advertisement information duration of a first video playback, which is represented as M; and
representing the advertisement information duration corresponding to the number of current video playback times as Y, and calculating in the following manner to obtain:

$Y=M-X*(n-1)$, wherein $X$ is a unit length of advertisement information.

16. The website server according to claim 12, wherein the processor is further configured for:
determining a time of a number of current video playback request, which is represented as Tn;
extracting, from the playback record, a time of a first video playback request, which is represented as T1;
subtracting Tn from T1 to obtain a subtraction value, determining that the subtraction value is less than the set time period; and
extracting the advertisement information duration of the first video playback from the playback record and calculates a Y value only after determining that the subtraction value is less than the set time period.

17. The website server according to claim 16, wherein the processor is further configured for:
sending an execution instruction when determining that the subtraction value is not less than the set time period; and
receiving the execution instruction, emptying the playback record, using the number of current video playback request as the first video playback request to be recorded in the playback record, recording a time of the first video playback request in the playback record; and
acquiring advertisement information duration corresponding to the first video playback request as the advertisement information duration corresponding to the number of current video playback times.

18. The method according to claim 1, wherein the number of current video playback times refers to a quantity of requests for video data of different contents made by the client.

* * * * *